(12) United States Patent
Hasegawa et al.

(10) Patent No.: US 10,217,982 B2
(45) Date of Patent: *Feb. 26, 2019

(54) METHOD FOR PRODUCING LAMINATED POROUS FILM

(71) Applicant: SUMITOMO CHEMICAL COMPANY, LIMITED, Chuo-ku, Tokyo (JP)

(72) Inventors: Hirohiko Hasegawa, Niihama (JP); Koichiro Watanabe, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/497,562

(22) Filed: Apr. 26, 2017

(65) Prior Publication Data

US 2017/0229696 A1 Aug. 10, 2017

Related U.S. Application Data

(63) Continuation of application No. 14/232,495, filed as application No. PCT/JP2012/068542 on Jul. 17, 2012, now Pat. No. 9,673,434.

(30) Foreign Application Priority Data

Jul. 28, 2011 (JP) ................................. 2011-165961

(51) Int. Cl.
| | | |
|---|---|---|
| H01M 2/14 | (2006.01) | |
| H01M 2/16 | (2006.01) | |
| B32B 5/22 | (2006.01) | |
| C08J 7/04 | (2006.01) | |

(52) U.S. Cl.
CPC ........... *H01M 2/145* (2013.01); *H01M 2/166* (2013.01); *H01M 2/1653* (2013.01); *H01M 2/1686* (2013.01)

(58) Field of Classification Search
CPC ..... B32B 5/22; C08J 2323/02; C08J 2403/02; C08J 7/047; H01M 2/145; H01M 2/1653; H01M 2/166; H01M 2/1686

USPC ........................ 427/58, 460, 535, 402, 407.1
See application file for complete search history.

(56) References Cited

U.S. PATENT DOCUMENTS

| | | | |
|---|---|---|---|
| 9,673,434 B2 * | 6/2017 | Hasegawa | ........... H01M 2/1653 |
| 2007/0190407 A1 | 8/2007 | Fujikawa et al. | |
| 2010/0190063 A1 | 7/2010 | Fukumoto et al. | |
| 2010/0285348 A1 | 11/2010 | Murata et al. | |

FOREIGN PATENT DOCUMENTS

| | | | |
|---|---|---|---|
| CN | 101326661 A | | 12/2008 |
| JP | 10-003898 A | | 1/1998 |
| JP | 10-172531 A | | 6/1998 |
| JP | 2004-227972 A | | 8/2004 |
| JP | 2008-016313 A | | 1/2008 |
| JP | 2008016313 A | * | 1/2008 |
| JP | 2009-76410 A | | 4/2009 |
| JP | 2009076410 A | * | 4/2009 |

OTHER PUBLICATIONS

First Office Action dated Jul. 31, 2014 in Chinese Application No. 201280035519.2.
Second Office Action dated Mar. 10, 2015 in Chinese Application No. 201280035519.2.
Dhindsa, Manjeet et al., "Reliable and low-voltage electrowetting on thin parylene films." Thin Solid Films 519 (2011) 3346-3351.

* cited by examiner

*Primary Examiner* — Alexander M Weddle
(74) *Attorney, Agent, or Firm* — Sughrue Mion, PLLC

(57) ABSTRACT

The present invention provides a method for producing a laminated porous film comprising a porous film substrate and a heat-resistant layer. The method comprises forming a heat-resistant layer mainly comprising a filler on the surface of the porous film substrate by applying a coating slurry comprising a solvent, a binder resin and the filler to the surface of the porous film substrate and then removing the solvent, wherein the coating slurry is prepared so as to have a contact angle of 75° or more with an untreated porous film substrate, and the method comprises conducting surface treatment of a porous film substrate so that the contact angle of the coating slurry with the porous film substrate can be 65° or less before applying the coating slurry to the surface of the porous film substrate.

8 Claims, No Drawings

METHOD FOR PRODUCING LAMINATED POROUS FILM

This is a continuation of U.S. application Ser. No. 14/232,495 filed Jan. 13, 2014, which is a national stage of PCT/JP2012/068542 filed on Jul. 17, 2012, claiming priority based on Japanese Patent Application No. 2011-165961, filed Jul. 28, 2011, the contents of all of which are incorporated herein by reference in their entirety.

TECHNICAL FIELD

The present invention relates to a method for producing a laminated porous film suitable for a non-aqueous electrolyte secondary battery separator.

BACKGROUND ART

Non-aqueous electrolyte secondary batteries, especially lithium secondary batteries, have been used widely as the batteries to be used for personal computers, cellular phones, personal digital assistant devices, etc. due to their high energy densities.

Such non-aqueous electrolyte secondary batteries typified by lithium secondary batteries are high in energy density and they may generate heat due to the occurrence of high current when internal short-circuit or external short-circuit has been caused, for example, by damage to a battery or damage to an instrument in which a battery is used. Therefore, non-aqueous electrolyte secondary batteries have been demanded to prevent generation of a certain amount or more of heat and secure high safety.

A method of imparting a shutdown function to prevent further heat generation by blocking the passage of ions between the positive and negative electrodes with a separator at the time of abnormal heat generation is common as means for securing safety. In a battery including this separator, the separator melts and closes pores on abnormal heat generation to block the passage of ions and thereby can suppress further generation of heat.

As such a separator having a shutdown function, a porous film made of a polyolefin (hereinafter sometimes referred to as a "porous polyolefin film") is used, for example. A separator made of the porous polyolefin film melts and closes pores at about 80 to 180° C. on abnormal heat generation of a battery to block (shut-down) the passage of ions and thereby suppress further generation of heat. However, in some cases, a separator made of a porous polyolefin film allows a positive electrode and a negative electrode to come into direct contact with each other due to the shrinkage, rupture, or the like thereof, resulting in the occurrence of short circuit. A separator made of a porous polyolefin film has insufficient shape stability and may be unable to suppress abnormal heat generation caused by short circuit.

On the other hand, there has been studied a method of imparting shape stability at elevated temperatures to a separator by laminating a porous film made of a heat-resistant material (hereinafter sometimes referred to as a "heat-resistant layer") to a porous polyolefin film. As such a highly heat-resistant separator, for example, a separator prepared by immersing a regenerated cellulose film in an organic solvent to render it porous, followed by lamination to a porous film as a substrate (hereinafter sometimes referred to as a "porous film substrate"), and a laminated porous film prepared by applying a coating slurry containing a particulate filler, a water-soluble polymer, and water to the surface of a porous film substrate, followed by drying have been proposed (see, for example, Patent Documents 1 and 2).

Although such a laminated porous film is produced by applying a coating slurry containing an inorganic filler and a binder resin to the surface of a porous film substrate uniformly, if the coating slurry penetrates into the porous film substrate during the application step, the binder resin, which is one of the components of the coating slurry, penetrates into the porous film substrate. Therefore, there is a problem that the inherent properties of the porous film substrate become no longer possible to be maintained, for example, the ion permeability or the shutdown property of the porous film substrate deteriorates.

Moreover, a porous film substrate for a laminated porous film is preferred to have a high porosity (for example, 50% or more) in order to gain improved ion permeability when used as a separator. In the porous film substrate, however, when the coating slurry has penetrated into the porous film substrate during the above-mentioned application step, the porous film substrate shrinks due to the shrinkage stress produced when the solvent component in the coating slurry that has penetrated is vaporized, so that the porous film substrate becomes incapable of maintaining a high porosity. Therefore, the porous film substrate has a problem that the characteristics of a resulting laminated porous film become inferior to those expected from the inherent characteristics of the porous film substrate.

PRIOR ART DOCUMENTS

Patent Documents

Patent Document 1: JP-A-10-3898
Patent Document 2: JP-A-2004-227972

SUMMARY OF THE INVENTION

It is an object of the present invention to provide a method for producing a laminated porous film capable of maintaining the characteristics of a porous film substrate even if a coating liquid is applied to the porous film substrate for forming a heat-resistant layer on the porous film substrate.

The present invention provides the following.

<1> A method for producing a laminated porous film comprising a porous film substrate and a heat-resistant layer, the method comprising forming a heat-resistant layer mainly comprising a filler on the surface of the porous film substrate by applying a coating slurry comprising a solvent, a binder resin and the filler to the surface of the porous film substrate and then removing the solvent, wherein the coating slurry is prepared so as to have a contact angle of 75° or more with an untreated porous film substrate, and the method comprises conducting surface treatment of a porous film substrate so that the contact angle of the coating slurry with the porous film substrate can be 65° or less before applying the coating slurry to the surface of the porous film substrate.

<2> A method for producing a laminated porous film comprising a porous film substrate and a heat-resistant layer, the method comprising forming a heat-resistant layer mainly comprising a filler on the surface of the porous film substrate by applying a coating slurry comprising a solvent, a binder resin and the filler to the surface of the porous film substrate and then removing the solvent, wherein the coating slurry is prepared so as to have a contact angle of 75° or more with an untreated porous film substrate, and the viscosity of the coating slurry is in the range of not less than 300 cP and not more than 10000 cP.

<3> The method for producing a laminated porous film according to <1> or <2>, wherein the porous film substrate is a porous film mainly comprising a polyolefin.

<4> The method for producing a laminated porous film according to any one of <1> to <3>, wherein the porosity of the porous film substrate is 55% by volume or more.

<5> The method for producing a laminated porous film according to any one of <1> to <4>, wherein the solvent is a mixed solvent of water and an organic polar solvent.

<6> The method for producing a laminated porous film according to <5>, wherein the organic polar solvent is an alcohol.

<7> The method for producing a laminated porous film according to any one of <1> to <6>, wherein the binder resin is a resin that is soluble in the coating slurry.

<8> The method for producing a laminated porous film according to any one of <1> to <7>, wherein the binder resin is a water-soluble cellulose ether.

<9> The method for producing a laminated porous film according to any one of <1> to <8>, wherein the filler is an inorganic filler.

MODE FOR CARRYING OUT THE INVENTION

<Method for Producing Laminated Porous Film>

The present invention provides a method for producing a laminated porous film comprising a porous film substrate and a heat-resistant layer. This method comprises applying a coating slurry comprising a solvent, a binder resin, and a filler to the surface of a porous film substrate and then removing the solvent, thereby forming a heat-resistant layer mainly comprising the filler on the surface of the porous film substrate, wherein the coating slurry is prepared so as to have a contact angle of 75° or more with an untreated porous film substrate.

The porous film substrate (hereinafter sometimes referred to as the "A layer") has a structure including interconnected pores therewithin, and a gas or a liquid can permeate from one side to the other side of the porous film substrate.

The heat-resistant layer (hereinafter sometimes referred to as the "B layer") has heat resistance at high temperatures and imparts a shape retention property to the laminated porous film. The B layer can be produced by applying the coating slurry comprising the solvent, the binder resin and the filler to the A layer and then removing the solvent.

Hereafter, detailed description is made to the physical properties and the methods for producing the porous film substrate (the A layer), the coating slurry, the heat-resistant layer (the B layer), and the laminated porous film.

<Porous Film Substrate (A Layer)>

The A layer has such a structure that the layer has therein interconnected fine pores and allows a gas and a liquid to permeate therethrough from one side to the other side.

The porous film substrate is porous and examples of the material thereof include a polyolefin, polyethylene terephthalate (PET), and cellulose, and the porous film substrate may be a nonwoven fabric. Generally, the porous film substrate is preferred to be especially a porous film mainly comprising a polyolefin (hereinafter sometimes referred to a "porous polyolefin film") in being capable of closing pores by melting (namely, exerting a shutdown function) upon abnormal heat generation of a battery.

The proportion of the polyolefin component adopted when the A layer is a porous polyolefin film is required to be 50% by volume or more of the entire A layer, preferably 90% by volume or more, and more preferably 95% by volume or more.

It is preferred that a high-molecular-weight component having a weight average molecular weight of $5 \times 10^5$ to $15 \times 10^6$ is contained in the polyolefin component of the porous polyolefin film. When the A layer is a porous polyolefin film, the inclusion of a polyolefin component having a weight average molecular weight of 1,000,000 or more as the polyolefin component of the A layer is preferred because this increases the strength of the A layer as well as the strength of the entire laminated porous film comprising the A layer.

Examples of the polyolefin include homopolymers and copolymers produced by polymerizing olefins such as ethylene, propylene, 1-butene, 4-methyl-1-pentene, and 1-hexene. Among them, a polyethylene prepared by homopolymerizing ethylene is preferred and a high-molecular-weight polyethylene having a weight average molecular weight of 1,000,000 or more is more preferred. A polypropylene prepared by homopolymerizing propylene is also preferred as the polyolefin.

Preferably, the porosity of the A layer is 55% by volume or more. When the property is 55% by volume or more, the porous polyolefin film excels in ion permeability and it exhibits excellent characteristics when used as a separator for a non-aqueous electrolyte secondary battery. The method of the present invention can be applied also to a porous film substrate having a high porosity of 55% by volume or more, which is likely to have a weak film structure.

The upper limit of the porosity of the A layer to which the method of the present invention can be applied, which depends greatly upon the material and processing method of the A layer, is about 80% by volume or less.

The pore diameter of the A layer is preferably 3 µm or less, more preferably 1 µm or less in terms of ion permeability or in preventing particles from entering into a positive electrode or a negative electrode when used as a separator of a battery.

The air permeability of the A layer expressed in Gurley value is usually within the range of 30 to 500 sec/100 cc, preferably within the range of 50 to 300 sec/100 cc.

When the A layer has an air permeability within the above-mentioned range, sufficient ion permeability can be obtained in use as a separator.

The thickness of the A layer is determined appropriately with consideration given to the thickness of the heat-resistant layer of the laminated porous film.

Especially in the case of using the A layer as a substrate and forming the B layer by applying the coating slurry onto one side or both sides of the A layer, the thickness of the A layer is preferably 4 to 40 µm, more preferably 7 to 30 µm.

The weight per area of the A layer is usually 4 to 15 g/m² and preferably 5 to 12 g/m² in view of the strength, thickness, handleability, and weight of the laminated porous film as well as the capability of increasing the weight energy density or the volume energy density of a battery in use as a separator of the battery.

The method for producing the A layer is not particularly restricted and examples thereof include a method in which a plasticizer is added to a thermoplastic resin, followed by forming into a film, and then the plasticizer is removed with an appropriate solvent as disclosed in JP-A-7-29563, and a method in which using a film made of a thermoplastic resin produced by a known method, structurally weak parts of the film are selectively stretched to form fine pores as disclosed in JP-A-7-304110. For example, in the event that the A layer is formed from a polyolefin resin containing an ultrahigh-molecular-weight polyethylene and a low-molecular-weight polyolefin having a weight average molecular weight of 10,000 or less, it is preferred to produce the A layer by the method shown below from the viewpoint of production cost.

That is, the A layer can be obtained by a method involving
(1) a step of kneading 100 parts by weight of the ultrahigh-molecular-weight polyethylene, 5 to 200 parts by weight of the low-molecular-weight polyolefin having a weight average molecular weight of 10,000 or less, and 100 to 400 parts by weight of an inorganic filler, such as calcium carbonate, to obtain a polyolefin resin composition,
(2) a step of forming a sheet using the polyolefin resin composition,
(3) a step of removing the inorganic filler from the sheet obtained in step (2), and
(4) a step of stretching the sheet obtained in step (3) to obtain an A layer. By altering stretching speed, stretching temperature, heat-setting temperature, etc. in step (4), it is possible to control the porosity of the A layer.

The A layer may be a commercially available product and preferably has the above-mentioned characteristics.

<Coating Slurry>

The coating slurry comprises a solvent, a binder resin, and a filler and has been prepared so as to have a contact angle with the untreated A layer of 75° or more (preferably 80° or more).

By adjusting the contact angle of the coating slurry with the untreated A layer to be equal to or more than the above-mentioned value, it is possible to prevent the coating slurry from penetrating into the A layer, thereby successfully suppress the degradation of the A layer caused by penetration of the coating slurry into the A layer, and successfully obtain a laminated porous film by laminating a B layer comprising the binder resin and the filler on the A layer without impairing high ion permeability of the A layer.

On the other hand, when the contact angle with the untreated A layer is less than 75°, the inherent physical properties of the A layer cannot be maintained because the coating slurry penetrates into the A layer.

Despite great dependency on the viscosity of the coating slurry and the surface condition of the A layer to be coated, a more preferred contact angle with the untreated A layer is 90° or less because this allows highly uniform coating.

The preparation of the coating slurry is carried out by adjusting the types and the mixing proportions of the binder resin, the filler, and the solvent to be contained in the coating slurry. It is preferred to adjust the contact angle of the coating slurry with the untreated A layer by the selection of the solvent and the adjustment of the concentration because the coating slurry can thereby be prepared easily without impairing the properties of the A layer.

As the binder resin contained in the coating slurry, preferred is a resin that has performance to bind filler particles to one another or filler particles to the porous film substrate, is insoluble in the electrolytic solution of a battery, and is electrochemically stable within the usage range of the battery.

Examples of the binder resin include polyolefins such as polyethylene and polypropylene; fluorine-containing resins such as polyvinylidene fluoride and polytetrafluoroethylene; fluorine-containing rubbers such as vinylidene fluoride-hexafluoropropylene-tetrafluoroethylene copolymers and ethylene-tetrafluoroethylene copolymers; rubbers such as styrene butadiene copolymers as well as hydrogenated products thereof, methacrylic ester copolymers, acrylonitrile-acrylic ester copolymers, styrene-acrylic ester copolymers, ethylene propylene rubber, and polyvinyl acetate; resins having a melting point or glass transition temperature of not lower than 180° C., such as polyphenylene ether, polysulfone, polyethersulfone, polyphenylene sulfide, polyetherimide, polyamide-imide, polyetheramide, and polyester; and water-soluble polymers such as polyvinyl alcohol, polyethylene glycol, cellulose ether, sodium alginate, polyacrylic acid, polyacrylamide, and polymethacrylic acid.

For the coating slurry, although a material in which such a binder resin is dispersed in the coating slurry can be used, a binder resin that can dissolve in the coating slurry is preferred in that it can enhance the uniformity of the coating slurry and can bind the filler therewith in a smaller amount.

The selection of such a binder resin depends on the solvent in the coating slurry and, of the above-listed binder resins, especially water-soluble polymers such as cellulose ether, sodium alginate and polyacrylic acid are preferred in that they allow for the use of a solvent mainly composed of water as a solvent and from the viewpoints of a process and an environmental load. Of the water-soluble polymers, cellulose ether is used preferably.

Specific examples of the cellulose ether include carboxymethylcellulose (CMC), hydroxyethylcellulose (HEC), carboxyethylcellulose, methylcellulose, ethylcellulose, cyanoethyl cellulose, and oxyethyl cellulose; CMC and HEC, which are superior in chemical stability, are particularly preferred, and especially, CMC is preferred. Carboxymethylcellulose (CMC) includes carboxymethylcellulose sodium.

An inorganic or organic filler can be used as the filler. Specific examples of the organic filler include fillers made of organic substances such as homopolymers or copolymers of two or more of styrene, vinyl ketone, acrylonitrile, methyl methacrylate, ethyl methacrylate, glycidyl methacrylate, glycidyl acrylate, methyl acrylate, etc.; fluororesins, such as polytetrafluoroethylene, tetrafluoroethylene-hexafluoropropylene copolymers, tetrafluoroethylene-ethylene copolymers, and polyvinylidene fluoride; melamine resins; urea resins; polyethylenes; polypropylenes; and polymethacrylates, and specific examples of the inorganic filler include fillers made of inorganic substances such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, and glass. These fillers may be used singly or in a mixture of two or more sorts thereof.

Of these, inorganic fillers are preferred as the filler, inorganic oxide fillers are more preferred, and an alumina filler is particularly preferred from the viewpoints of heat resistance and chemical stability.

While alumina includes many crystal forms, such as α-alumina, β-alumina, γ-alumina, and θ-alumina, any of them can be used suitably. Of these, α-alumina is most preferable because of its particularly high thermal or chemical stability.

The inorganic filler can be in various shapes depending upon the method for producing the inorganic substance to be used or dispersion conditions used in the preparation of the coating slurry, such as a spherical shape, an oval shape, a short shape, a gourd-like shape, and an infinite shape without any specific shape, and any shape can be used.

The average particle diameter of the filler is preferably 3 μm or less, and more preferably 1 μm or less. Examples of the shape of the filler include a spherical shape and a gourd-like shape. The average particle diameter of the filler can be determined by a method in which 25 particles are extracted arbitrarily, the particle size (diameter) of each particle is measured with a scanning electron microscope (SEM), and the average value of the 10 particle sizes is calculated as the average particle diameter, or a method in which the BET specific surface area is measured, and then the average particle diameter is calculated by spherically approximating the BET specific surface area. In the calculation of an average particle diameter with a SEM, when the shape of the filler is not a spherical shape, the length of the particle measured in the direction in which the largest length is detected is defined as the particle diameter.

Two or more sorts of fillers differing in particle diameter and/or specific surface area may be included simultaneously.

The content of the filler is preferably 60% by volume or more and more preferably 70% by volume or more where the total content of the solid (the filler and the binder resin) in the coating slurry is taken as 100% by volume in order to inhibit vacancies formed by filler particles in contact with one another from being clogged with other constituent ingredients, such as the binder resin, when a heat-resistant layer is formed of the coating slurry and in order to keep good ion permeability.

The solvent can dissolve or disperse the filler and the binder resin and also has characteristics as a dispersing medium. The solvent may be a single solvent or alternatively may be a mixed solvent. It is preferred that the contact angle of the solvent with the porous film substrate to be coated is within the above-mentioned range.

For example, in the case of using a porous polyolefin film to be used commonly as a separator for a non-aqueous electrolyte secondary battery, examples of the solvent include water, alcohols such as methanol, ethanol, and isopropanol, acetone, toluene, xylene, hexane, N-methylpyrrolidone, N,N-dimethylacetamide, and N,N-dimethylformamide, and these can be used singly or a plurality of them may be mixed for use as long as they are miscible with one another.

Although the solvent may be composed of only water, a mixed solvent of water and an organic polar solvent is preferred in that it has high removal rate by drying and sufficient solvency for the above-mentioned water-soluble polymer. When the solvent is composed of only an organic solvent, the solvent may be deficient in leveling due to an excessively increased drying rate, and it also may be deficient in solvency in the case of using the above-mentioned water-soluble polymer as the binder resin.

As the organic polar solvent to be used for the mixed solvent, alcohols that are miscible with water in any proportions and have moderate polarities are preferred, and of them, methanol, ethanol, and isopropanol are used. While the proportions of the water and the polar solvent are selected in consideration of the leveling property and the type of the binder resin to be used within such a range that the above-mentioned contact angle range is achieved, the mixed solvent usually contains water in a content of 50% by weight of more.

The coating slurry may, as required, comprise ingredients other than the filler and the binder resin as long as the object of the present invention is not impaired. Examples of such ingredients include a dispersing agent, a plasticizer, and a pH adjuster.

The method for obtaining the coating slurry by dispersing the filler and the binder is not particularly restricted as long as it is a method necessary for obtaining a uniform coating slurry.

Examples thereof include a mechanical agitation method, an ultrasonic dispersion method, a high pressure dispersion method, and a media dispersion method.

The order of mixing is arbitrary as long as no particular problem, such as generation of precipitations, is caused; for example, the filler, the binder resin, and other ingredients may be added to the solvent at once and then mixed, or alternatively the respective ingredients may be separately dispersed in the solvent and then mixed.

The viscosity of the coating slurry is preferably within the range of not less than 300 cP and not more than 10000 cP, more preferably within the range of not less than 500 cP and not more than 5000 cP, even more preferably within the range of not less than 800 cP and not more than 3000 cP, and particularly preferably within the range of not less than 800 cP and not more than 1000 cP. The "cP" represents centipoise.

When the surface treatment of the porous film substrate is carried out before the application of the coating slurry to the surface of the porous film substrate so that the contact angle of the coating slurry with the porous film substrate may become 65° or less, the viscosity of the coating slurry is may be within the range of not less than 10 cP and not more than 10000 cP, preferably within the range of not less than 50 cP and not more than 5000 cP, more preferably within the range of not less than 50 cP and not more than 3000 cP, and even more preferably within the range of not less than 50 cP and not more than 1000 cP.

<Method of Applying Coating Slurry>

The method of applying the coating slurry to the A layer is not particularly restricted as long as a uniform laminated porous film can thereby be obtained, and examples thereof include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a die coater method, a screen printing method, and a spray coating method.

Although the surface to be coated is restricted in some cases depending upon the application of the laminated porous film, either of one side and both sides of the A layer may be coated as long as the performance of the laminated porous film is not impaired; in double side coating, either sequential double side coating or simultaneous double side coating may be adopted.

The coating slurry may be applied directly to the A layer. However, in order to apply the coating slurry onto the A layer uniformly and thinly without causing defective application, such as shedding of the slurry, it is preferred to subject the surface of the A layer to surface treatment before applying the coating slurry to the surface of the A layer so that the contact angle with the coating slurry may become 65° or less, particularly preferably 60° or less.

By carrying out the surface treatment of the A layer so that the contact angle with the coating slurry may become not more than the above-mentioned value, the affinity of the coating slurry with the A layer increases, so that the coating slurry can be applied to the A layer more uniformly.

The "surface treatment of the A layer" as referred to herein means treatment to modify the surface of the A layer physically or chemically so as to satisfy the above-mentioned condition with respect to contact angle, and specifically means to treat the surface of the A layer so that its surface roughness may be increased or the surface may come to have affinity with the ingredients (especially, the solvent) of the coating slurry.

By subjecting the A layer to surface treatment, coatability is improved, so that a more uniform heat-resistant layer (B layer) can be obtained. The surface treatment may be carried out at any time before carrying out coating, and to carry out the surface treatment just before coating is preferred in that the influence of change with time can be reduced.

The method of the surface treatment may be any method as long as the above-mentioned conditions with respect to contact angle are satisfied, and specific examples thereof include a chemical agent treatment with an acid or an alkali, a corona discharge treatment method, a plasma treatment method, a mechanical surface roughening method, a solvent treatment method, an acid treatment method, and an ultraviolet ray oxidation method.

In the corona discharge treatment method, the A layer can be modified in a relatively short time and the inherent characteristics of the A layer are preserved approximately completely because the modification by corona discharge is limited only to the vicinity of the surface of the A layer and the penetration of the coating slurry is limited only to the vicinity of the surface. Therefore, excessive penetration of the coating slurry into the pores (voids) of the B film can be inhibited during the application step and deterioration in the shutdown property of the A layer caused by solvent residue or by binder resin deposition can be avoided.

<Method of Removing Solvent in Coating Slurry>

A heat-resistant layer (a B layer) is formed on the A layer by removing the solvent from the coating slurry layer applied onto the A layer.

The method for removing the solvent is commonly a method that involves drying. The method of drying may be any method, such as natural drying, blow drying, heat drying, and reduced pressure drying. It is also permitted to carryout drying after replacing the solvent of the coating slurry with another solvent (solvent X).

In the case where heating is carried out in removing the solvent of the coating slurry or solvent X from the A layer onto which the coating slurry has been applied, it is preferred to carry out the heating at a temperature at which the air permeability of the A layer is prevented from lowering in order to avoid the lowering of the air permeability due to shrinkage of pores of the A layer.

<Heat-Resistant Layer (B Layer)>

The thickness of the B layer (the total thereof is taken when provided on both sides) is usually 0.1 to 20 μm, and preferably 2 to 15 μm although it depends on the thickness of the A layer. When the thickness of the B layer is excessively large, the load characteristics of a non-aqueous electrolyte secondary battery may deteriorate when the laminated porous film obtained by the method of the present invention is used as a separator, whereas when the thickness is excessively small, it may be difficult to impart sufficient safety, for example, the separator may shrink due to failure to resist against the thermal shrinkage of the porous film substrate on heat generation of the battery.

The porosity of the B layer is preferably 20 to 85% by volume, and more preferably 40 to 75% by volume. When the porosity is within such a range, it is possible to make higher the amount of an electrolytic solution retained, the thickness of the laminated porous film, and the volume energy density in use as a separator in a battery. The B layer is mainly made of a filler, wherein the weight proportion of the filler to the total weight of the filler and the binder resin is 50% by weight or more, preferably 60% by weight or more, more preferably 70% by weight or more, even more preferably 80% by weight or more, and particularly preferably 90% by weight or more. The upper limit of the weight proportion is preferably 99% by weight or less, and more preferably 98% by weight or less.

<Laminated Porous Film>

Using the above-mentioned method of the present invention, a highly heat-resistant B layer can be laminated without impairing the characteristics of the A layer because the load which the A layer receives during application is rendered extremely small.

Accordingly, the method of the present invention has a particularly significant effect on a porous film substrate with a high porosity that has a weak film structure and that is difficult to be coated, and a resulting laminated porous film with a heat-resistant layer can achieve high ion permeability of the porous film substrate and high safety of the heat-resistant layer simultaneously.

The overall thickness of the laminated porous film (the A layer+the B layer) is usually 5 to 80 μm, preferably 5 to 50 μm, and particularly preferably 6 to 35 μm. When the overall thickness of the laminated porous film is less than 5 μm, the laminated porous film is likely to rupture. If the thickness is excessively large, a non-aqueous electrolyte secondary battery in which the laminated porous film is used as the separator thereof tends to have a reduced electric capacitance.

The porosity of the entire part of the laminated porous film is usually 30 to 85% by volume, preferably 35 to 80% by volume.

The air permeability of the laminated porous film expressed in Gurley value is preferably 50 to 2000 sec/100 cc, more preferably 50 to 1000 sec/100 cc.

When a laminated porous film has an air permeability within such a range, it will exhibit sufficiently high ion permeability in the event that a non-aqueous electrolyte secondary battery is produced using the film as a separator, so that a loading characteristic that is high as a battery can be obtained.

The shape retention ratio upon heating of the laminated porous film at high temperatures at which shutdown occurs, expressed by the smaller value of the MD direction or the TD direction, is preferably 95% or more, more preferably 97% or more. The MD direction as referred to herein means the longitudinal direction at the time of sheet production, and the TD direction means the width direction at the time of sheet production. The elevated temperature at which shutdown occurs is a temperature of 80 to 180° C. and is usually about 130° C. to about 150° C.

The laminated porous film may comprise a porous film other than the porous film substrate (A layer) and the heat-resistant layer (B layer), such as an adhesive film and a protective film, as long as the porous film does not disturb the object of the present invention.

The laminated porous film obtained by the method of the present invention can be suitably used for a separator of batteries, especially, non-aqueous electrolyte secondary batteries such as lithium secondary batteries.

EXAMPLES

The present invention is described more concretely below with reference to examples, but the invention is not limited thereto. In examples and comparative examples, physical properties of the laminated porous films were measured by the following methods (1) through (9).

(1) Thickness Measurement (Unit: μm)

The thickness of films was measured in accordance with JIS standard (K7130-1992).

(2) Weight Per Area (Unit: g/m²)

A film obtained was cut into a square measuring 10 cm long on each side and then the weight W (g) thereof was measured. Calculation was carried out by following weight per area (g/m²)=W/(0.1×0.1). The weight per area of the heat-resistant layer (B layer) was calculated by subtracting the weight per area of the porous film substrate (A layer) from the weight per area of the laminated porous film.

(3) Porosity (Unit: % by Volume)

A film was cut into a square measuring 10 cm long on each side, and then the weight W (g) and the thickness D (cm) thereof were measured. The weights of the materials contained in the sample were calculated, the weight of each material Wi (g) was divided by the true specific gravity to calculate the volume of each material, and then the porosity (% by volume) was calculated from the following formula.

Porosity (% by volume)=100−[{($W1$/true specific gravity 1)+($W2$/true specific gravity 2)+ . . . +($Wn$/true specific gravity $n$)}/(10×10× $D$)]×100

(4) Air Permeability (Unit: Sec/100 cc)

The air permeability of a film was measured using a Gurley densometer equipped with a digital timer manufactured by Toyo Seiki Seisaku-sho Ltd. on the basis of JIS P 8117.

(5) Contact Angle Measurement

One drop (2 μL) of a coating slurry was dropped into a sample, and a contact angle was measured in 10 to 30 seconds after the dropping. This contact angle measurement was repeated 5 times in total and the average thereof was used as the contact angle of the sample. A contact angle meter (Model CA-X, manufactured by Kyowa Interface Science Co., Ltd.) was used for the measurement of a contact angle.

(6) Measurement of Thickness Change of Porous Film Substrate (A Layer) Caused by Application A laminated porous film was immersed in water and thereby the heat-resistant layer (B layer) was washed away with water completely. Subsequently, without drying, the thickness of the porous film substrate (A layer) was measured by the same method as in the thickness measurement (1), and then the change in thickness of the A layer before and after coating was evaluated using the following formula.

Thickness change (μm) of $A$ layer=(thickness of $A$ layer after removal of $B$ layer)−(thickness of $A$ layer before application of $B$ layer)

(7) Thickness of Heat-Resistant Layer (B Layer)

The thickness of a B layer was calculated by the following formula.

Thickness (μm) of $B$ layer=(overall thickness of laminated porous film)−(thickness of $A$ layer after removal of $B$ layer)

(8) Evaluation of Shutdown (SD) Performance

A cell for the measurement of shutdown was prepared by impregnating a 17.5 mmϕ laminated porous film with an electrolytic solution, sandwiching the film between two SUS electrodes, and then fixing the film with a clip. A solution prepared by dissolving 1 mol/L of $LiBF_4$ in a mixed solvent of 50% by volume of ethylene carbonate and 50% by volume of diethyl carbonate was used as the electrolytic solution. Terminals of an impedance analyzer were connected to the electrodes of the assembled cell, and the resistivity at 1 kHz was measured while raising the temperature at a rate of 15° C./minute in an oven. Thus, the resistivity measured at 145° C. was considered as the shutdown performance of the laminated porous film.

(9) Viscosity of Coating Slurry

The measured value at 23° C. and 100 rpm measured by using a B type viscometer was regarded as the viscosity of the coating slurry.

Example 1

(1) Preparation of Coating Slurry

The coating slurry of Example 1 was prepared in the following procedures. First, carboxymethylcellulose sodium (CMC, Cellogen 3H produced by Dai-Ichi Kogyo Seiyaku Co., Ltd.) was dissolved in a 20% by weight aqueous ethanol solution as a medium, yielding a CMC solution (CMC concentration: 0.70% by weight vs. CMC solution).

Subsequently, 3500 parts by weight alumina (AKP3000, produced by Sumitomo Chemical Co., Ltd.) was added and mixed with 100 parts by weight, in a CMC equivalent, of the CMC solution, followed by treatment with a Gaulin Homogenizer under high pressure dispersion conditions (60 MPa) repeated three times. Thus, a coating slurry 1 was prepared. The viscosity of the coating slurry 1 was 80 cP. The composition and viscosity of the coating slurry 1 are collectively shown in Table 1.

(2) Preparation of Porous Film Substrate

A polyolefin resin composition was prepared by adding 70% by weight of an ultrahigh-molecular-weight polyethylene powder (340M, produced by Mitsui Chemicals, Inc.) and 30% by weight of a polyethylene wax with a weight average molecular weight of 1000 (FNP-0115, produced by Nippon Seiro Co., Ltd.) as well as, per 100 parts by weight of the ultrahigh-molecular-weight polyethylene and the polyethylene wax in total, 0.4% by weight of an antioxidant (Irg 1010, produced by Ciba Specialty Chemicals), 0.1% by weight of an antioxidant (P168, produced by Ciba Specialty Chemicals), and 1.3% by weight of sodium stearate, further adding calcium carbonate with an average pore diameter of 0.1 μm (produced by Maruo Calcium Co., Ltd.) so as to occupy 38% by volume based on the overall volume, mixing these ingredients in the form of powder with a Henschel mixer, followed by melt-kneading with a twin screw kneading machine. The polyolefin resin composition was rolled into a sheet with a pair of rolls having a surface temperature of 150° C. Calcium carbonate was removed by immersing the sheet into an aqueous hydrochloric acid solution (hydrochloric acid: 4 mol/L, nonionic surfactant: 0.5% by weight) and then the sheet was stretched in TD, affording a porous film substrate A1 having the properties given below.

<Properties of Porous Film Substrate A1>

Thickness: 18.2 μm

Weight per area: 7.2 g/m²

Air permeability: 89 sec/100 ml (3) Contact Angle Evaluation

The contact angle of the porous film substrate A1 (untreated) obtained in (2) with the coating slurry 1 was 80°.

Subsequently, surface treatment was conducted by subjecting the surface of the porous film substrate A1 to corona discharge treatment at an output of 70 W/(m²/minute). The contact angle of the porous film substrate A1 after the surface treatment with the coating slurry 1 was 40°.

(4) Preparation of Laminated Porous Film

A laminated porous film was prepared by applying the above-mentioned coating slurry 1 to both surfaces of the surface-treated porous film A1 as a substrate with a gravure coating machine, and then drying the slurry.

(5) Heat Resistance Evaluation

A resulting laminated porous film was cut into 8 cm×8 cm. The laminated porous film on which a square of 6 cm×6 cm had been drawn was placed in an oven of 150° C. and heated for one hour while being sandwiched between paper sheets. The shape retention ratio upon heating in the MD direction (i.e., the longitudinal direction at the time of sheet production) and the TD direction (i.e., the width direction at the time of sheet production) was calculated by measuring the distance between the lines of the film after heating. Thus, the shape retention ratio was found to be 99% in both MD and TD, so that the laminated porous film was found to be high in heat resistance.

Example 2

(1) Preparation of Coating Slurry

The coating slurry of Example 2 was prepared in the following procedures.

First, carboxymethylcellulose sodium (CMC, Cellogen 3H produced by Dai-Ichi Kogyo Seiyaku Co., Ltd.) was dissolved in a 20% by weight aqueous ethanol solution as a medium, yielding a CMC solution (CMC concentration: 0.70% by weight vs. CMC solution).

Subsequently, 3500 parts by weight alumina (AKP3000, produced by Sumitomo Chemical Co., Ltd.) was added and mixed with 100 parts by weight, in a CMC equivalent, of the CMC solution, followed by treatment with a Gaulin Homogenizer under high pressure dispersion conditions (10 MPa) repeated three times. Thus, a coating slurry 2 was prepared. The viscosity of the coating slurry 2 was 980 cP. The composition and viscosity of the coating slurry 2 are collectively shown in Table 1.

(2) Preparation of Porous Film Substrate

A porous film substrate A2 having the properties given below was obtained by following the operations of the above-mentioned (2) Preparation of porous film substrate of Example 1.

<Properties of Porous Film Substrate A2>
  Thickness: 18.1 μm
  Weight per area: 7.9 g/m$^2$
  Air permeability: 110 sec/100 ml (3) Contact Angle Evaluation The contact angle of the resulting porous film substrate A2 (untreated) with the coating slurry 2 was 80°.

(4) Preparation of Laminated Porous Film

A laminated porous film was prepared by applying the above-mentioned coating slurry 2 to one side of the porous film substrate A2 with a gravure coating machine, and then drying the slurry.

Example 3

(1) Preparation of Porous Film Substrate A3

A porous film substrate A3 having the properties given below was obtained by following the above-mentioned (2) Preparation of porous film substrate of Example 1.

<Properties of Porous Film Substrate A3>
  Thickness: 14.9 μm
  Weight per area: 7.1 g/m$^2$
  Air permeability: 128 sec/100 ml (2) Contact Angle Evaluation The contact angle of the porous film substrate A3 (untreated) with the coating slurry 1 was 80°. Subsequently, surface treatment was conducted by subjecting the surface of the porous film substrate A3 to corona discharge treatment by following the above-mentioned (3) Preparation of laminated porous film of Example 1. The contact angle of the porous film substrate A3 after the surface treatment with the coating slurry 1 was 40°.

(3) Preparation of Laminated Porous Film

A laminated porous film was prepared by applying the above-mentioned coating slurry 1 to both surfaces of the surface-treated porous film substrate A3 with a gravure coating machine, and then drying the slurry.

Comparative Example 1

The preparation of a laminated porous film was attempted by carrying out the same operations as those in the above-mentioned (4) Preparation of laminated porous film of Example 1 except that the corona discharge treatment was not carried out and the above-mentioned coating slurry 1 was applied onto both surfaces of the porous film substrate A1 and then dried. However, the coating slurry was repelled on the surfaces of the porous film substrate, so that a uniform laminated porous film was not obtained.

Comparative Example 2

(1) Preparation of Coating Slurry

A coating slurry 3 was prepared by carrying out the same operations as those for the coating slurry 1 except that the concentration of the aqueous ethanol solution was adjusted to 30% by weight in the operations of the above-mentioned (1) Preparation of coating slurry of Example 1. The viscosity of the coating slurry 3 was 75 cP.

The composition and viscosity of the coating slurry 3 are collectively shown in Table 1.

(2) Contact Angle Evaluation

The contact angle of the porous film substrate A1 with the coating slurry 3 was evaluated. As a result, the contact angle of the porous film substrate A1 with the coating slurry 3 was 65°.

(3) Preparation of Laminated Porous Film

A laminated porous film was prepared by applying the coating slurry 3 to both surfaces of the above-mentioned porous film substrate A1 (untreated), and then drying the slurry.

Comparative Example 3

(1) Contact Angle Evaluation

The contact angle of the porous film substrate A3 (untreated) obtained in the above-mentioned (1) of Example 3 with the coating slurry 3 was 65°.

Subsequently, surface treatment was conducted by subjecting the surface of the porous film substrate A3 to corona discharge treatment by following the above-mentioned (3) Preparation of laminated porous film of Example 1. The contact angle of the porous film substrate A3 after the surface treatment with the coating slurry 3 was 35°.

(2) Preparation of Laminated Porous Film

A laminated porous film was obtained in the same operations as in the above-mentioned Comparative Example 3 except that the coating slurry 3 was used as a coating slurry.

The dispersion conditions, composition, and viscosity of the coating slurries are shown in Table 1. The physical properties of the above-mentioned porous film substrates are shown in Table 2, and the physical properties of the laminated porous films are shown in Table 3.

TABLE 1

| Sample | Dispersion conditions | | Binder resin (part by weight) CMC | Filler (part by weight) Alumina AKP3000 | Liquid composition (% by weight) | | | Viscosity of coating slurry (cP) |
|---|---|---|---|---|---|---|---|---|
| | Dispersing machine | Number of passes (pass) | Dispersing pressure (MPa) | | | Binder resin | Water | Ethanol |
| Coating slurry 1 | gaulin | 3 | 60 | 100 | 3500 | 0.7 | 80 | 20 | 80 |
| Coating slurry 2 | gaulin | 3 | 10 | 100 | 3500 | 0.7 | 80 | 20 | 980 |
| Coating slurry 3 | gaulin | 3 | 60 | 100 | 3500 | 0.7 | 70 | 30 | 75 |

TABLE 2

| | | | | | Porous film substrate (A layer) | | | | | | | |
|---|---|---|---|---|---|---|---|---|---|---|---|---|
| | | | | | Contact angle (°) | | Thickness μm | Weight per area g/m² | Porosity % by volume | Air permeability Gurley sec/100 cc | SD performance Ω | Change in thickness before and after application μm |
| Sample | No. | Material | Surface treatment | Coated surface | Untreated | After surface treatment | | | | | | |
| Example 1 | A1 | PE | Present | Both sides | 80 | 40 | 18.2 | 7.2 | 58 | 89 | 7800 | 0.0 |
| Example 2 | A2 | PE | Absent | One side | 80 | — | 18.1 | 7.9 | 54 | 110 | 7250 | 0.0 |
| Example 3 | A3 | PE | Present | Both sides | 80 | 40 | 14.9 | 7.1 | 49 | 128 | 8400 | 0.0 |
| Comparative Example 1 | A1 | PE | Absent | | 80 | — | 18.2 | 7.2 | 58 | 89 | 7800 | — |
| Comparative Example 2 | A1 | PE | Absent | Both sides | 65 | — | 18.2 | 7.2 | 58 | 89 | 7800 | −1.5 |
| Comparative Example 3 | A3 | PE | Present | Both sides | 65 | 35 | 14.9 | 7.1 | 49 | 128 | 8400 | 0.0 |

PE: polyethylene

TABLE 3

| | | Heat-resistant layer (B layer) | | Properties of laminated porous film | | | |
|---|---|---|---|---|---|---|---|
| Sample | Coating slurry | Thickness μm | Weight per area g/m² | Overall film thickness μm | Overall weight per area g/m² | Air permeability Gurley sec/100 cc | SD performance Ω |
| Example 1 | Coating slurry 1 | 7.5 | 9.7 | 25.7 | 16.9 | 114 | 7500 |
| Example 2 | Coating slurry 2 | 8.1 | 12.3 | 26.2 | 20.2 | 145 | 6700 |
| Example 3 | Coating slurry 1 | 10.0 | 10.4 | 24.9 | 17.5 | 176 | 8000 |
| Comparative Example 1 | Coating slurry 1 | — | — | — | — | — | — |
| Comparative Example 2 | Coating slurry 3 | 6.4 | 9.4 | 23.1 | 16.6 | 143 | 230 |
| Comparative Example 3 | Coating slurry 3 | 6.9 | 10.0 | 21.8 | 17.1 | 187 | 200 |

INDUSTRIAL APPLICABILITY

According to the present invention, the load which a porous film substrate receives during an application process is rendered extremely small. Therefore, change in physical properties during an application step can be suppressed even if a porous film substrate with a high porosity is used, so that it is possible to provide a laminated porous film that has a heat-resistant layer high in shape retainability under heating, that is superior in ion permeability, and that is suitable as a separator for a non-aqueous electrolyte secondary battery.

According to the present invention, change in physical properties during an application step can be suppressed, and it is possible to provide a laminated porous film that has a heat-resistant layer high in shape retainability under heating and that is excellent in ion permeability. The laminated porous film can be used suitably as a separator for a non-aqueous electrolyte secondary battery.

The invention claimed is:

1. A method for producing a laminated porous film comprising a treated porous film and a heat-resistant layer,
the method comprising treating an untreated porous film to provide the treated porous film, and
forming a heat-resistant layer comprising a filler on the surface of the treated porous film by applying a coating slurry comprising a solvent, a binder resin and the filler to the surface of the treated porous film and then removing the solvent,
wherein the coating slurry is prepared so as to have a contact angle of 75° or more with the untreated porous film to prevent the coating slurry from penetrating into the treated porous film, and the viscosity of the coating slurry is in the range of not less than 300 cP and not more than 10000 cP.

2. The method for producing a laminated porous film according to claim 1, wherein the treated porous film is a porous film comprising a polyolefin.

3. The method for producing a laminated porous film according to claim 1, wherein the porosity of the treated porous film is 55% by volume or more.

4. The method for producing a laminated porous film according to claim 1, wherein the solvent is a mixed solvent of water and an organic polar solvent.

5. The method for producing a laminated porous film according to claim 4, wherein the organic polar solvent is an alcohol.

6. The method for producing a laminated porous film according to claim 1, wherein the binder resin is a resin that is soluble in the coating slurry.

7. The method for producing a laminated porous film according to claim 1, wherein the binder resin is a water-soluble cellulose ether.

8. The method for producing a laminated porous film according to claim 1, wherein the filler is an inorganic filler.

* * * * *